United States Patent [19]

Yamasaki et al.

[11] Patent Number: 5,543,168
[45] Date of Patent: Aug. 6, 1996

[54] PROCESS FOR PRODUCING FRESH THREE-LAYERED NOODLES

[75] Inventors: Masahiro Yamasaki, Shiga; Koichiro Housai, Osaka; Hiromi Shirahase; Nobuyuki Akamatsu, both of Shiga; Michiyuki Tabuchi, Kyoto; Toshinari Hirata; Yoshifumi Miyazaki, both of Shiga, all of Japan

[73] Assignee: Nissin Shokuhin Kabushiki Kaisha, Osaka, Japan

[21] Appl. No.: 302,830

[22] PCT Filed: Mar. 25, 1993

[86] PCT No.: PCT/JP93/00364

§ 371 Date: Dec. 1, 1994

§ 102(e) Date: Dec. 1, 1994

[87] PCT Pub. No.: WO94/15485

PCT Pub. Date: Jul. 21, 1994

[30] Foreign Application Priority Data

Jan. 14, 1993 [JP] Japan ..................................... 5-004954

[51] Int. Cl.$^6$ ............................. A23L 1/0532; A23B 4/12
[52] U.S. Cl. ............................. 426/557; 426/94; 426/275; 426/451; 426/502; 426/575
[58] Field of Search .............................. 426/557, 94, 275, 426/502, 451, 575

[56] References Cited

U.S. PATENT DOCUMENTS 4,244,974  1/1981  Minami et al. ......................... 426/557

FOREIGN PATENT DOCUMENTS

| 4642927 | 12/1971 | Japan ..................................... 426/557 |
| 51-79749 | 7/1976 | Japan . |
| 52-90642 | 7/1977 | Japan . |
| 58-107146 | 6/1983 | Japan . |
| 60-217868 | 10/1985 | Japan . |
| 233660 | 8/1994 | Japan ..................................... 426/557 |
| 0615913 | 7/1978 | U.S.S.R. ................................ 426/557 |

OTHER PUBLICATIONS

Teague, G. 1988, "Xanthan gum and Alginates in Fresh & Dried Pasta for texture Improvement", Cereal Foods World, 33(8) p. 662.

*Primary Examiner*—Helen Pratt
*Attorney, Agent, or Firm*—Marshall, O'Toole, Gerstein, Murray & Borun

[57] ABSTRACT

A process for producing fresh three-layered noodles by: preparing an outer-layer dough by kneading grain flour with water; preparing an inner-layer dough by adding, to grain flour, (a) at least one alkaline agent and (b) an alginic acid compound selected from the group consisting of an alginic acid, an alginic acid salt, and mixtures thereof, and kneading with water; preparing dough sheets from each of the inner-layer and the outer-layer dough through rolling of said inner- and outer-layer dough, and rolling the obtained dough sheets to make a layered dough sheet of an outer-layer/inner-layer/outer-layer structure; preparing noodle strands by cutting the layered dough sheet having such three-layer structure, and gelatinizing the noodle strands; and treating the gelatinized noodle strands with a solution of one or more acids to acidify the noodle strands.

22 Claims, No Drawings

PROCESS FOR PRODUCING FRESH THREE-LAYERED NOODLES

TECHNICAL FIELD

The present invention relates to a process for producing wet and fresh three-layered noodles having a longer shelflife and an excellent taste and texture.

BACKGROUND ART

In general, noodles having much water content tend to be spoiled by microorganisms such as bacteria and molds. Therefore, in order to keep a shelflife of the noodles even at room temperature for a long term over several months, the noodles have often been dried and the water content has been reduced by hot-air drying, sun drying, frying and vacuum drying. However, once the water content of the noodles has been reduced, it would be difficult to obtain the desirable texture of non-dried fresh noodles even if the dried noodles were rehydrated and restored for eating with water or hot water. Accordingly, research and development on the wet noodles which can be preserved even at room temperature without drying the fresh noodles has been continued.

The wet noodles are called, generally, fresh noodles and are directed to boiled noodles, steamed noodles, raw noodles having much water content, or noodles having slightly reduced water content in comparison with the foregoing noodles, and "desirable texture of the fresh noodles" referred in this specification is directed to the texture of noodles just cooked by boiling or steaming, and particular to the texture on "smoothness" and "stickiness" of the noodles, in addition to "stiffness" and "elasticity" thereof.

As methods to preserve the wet fresh noodles for several months at room temperature, there have been known methods, i.e., a method of adding bacteriostat(s), such as propyleneglycol, a method of sterilizing by retort, and a method of combining pH adjustment with heat sterilization. However, the former method of adding bacteriostat(s) will not provide a good image to consumers in view of using additives, and the latter method of so-called retort sterilization that conducts sterilization for over 4 minutes at 120° C. or similar conditions is not preferable, because the color of the noodles becomes dark and the desirable texture of noodles is lost. Further, in the method for improving shelflife by using both pH adjustment (to acidify the noodles) and heat sterilization, "stiffness" and "elasticity" are lost, then the desirable texture of the noodles is also not obtained, because the water penetration into the inside of the noodle strands after the sterilizing step and the moisture gradient between the inside and the outside of the noodle strands is eliminated.

Then, the present inventors developed a process for producing wet noodles having a longer shelflife even at a room temperature, and having "stiffness" and "elasticity" by a method comprising the steps of preparing noodles by adding alkaline agents and alginic acids to the flours, acid-treating the noodles so obtained, and heat-sterilizing them (See, Japanese Patent Application No. 3-174129). However, according to this invention, "smoothness" and "stickiness" of the noodles were insufficient, though "stiffness" and "elasticity" of the noodles can be obtained well.

Although techniques to incorporate alginic acids into the noodles are disclosed in the prior art of Japanese Patent Publication No. 61-12662, Japanese Patent Publication No. 1-49472, Japanese Patent Provisional Publication No. 62-79749, and Switzerland Patent Application No. 02444/90-9, said techniques are directed to the action of calcium salts against the noodles to which alginic acids are added. These methods were making use of insolubilization and gelation of alginic acids due to the formation of calcium alginates which are calcium salts of alginic acids. However, "stiff" and "elastic" texture of the noodles and a longer shelflife at room temperature, which can be obtained by adding alginic acids to noodles and treating them with acids along with disclosure of the patent application (Japanese Patent Application No. 3-174129) by the present inventors, could not be obtained by the methods aforementioned.

DISCLOSURE OF INVENTION

As a result of further investigation by the present inventors to eliminate the defects insufficient "smoothness" and "stickiness" of noodles referred in said application (Japanese Patent Application No. 3-174129), a process for producing fresh noodles having a longer shelflife, and desirable texture similar to the fresh noodles with "smoothness" and "stickiness" as well as "stiffness" and "elasticity" has been established by making noodles of a three-layered structure and applying the technique of adding alginic acids to the inner layer, and treating them with acid(s).

Further, the fresh noodles produced by this method have merits wherein the noodles are tough against becoming dull texture, and have preferable "looseness" of noodle strands when the noodle mass have been cooked.

That is to say, a method of the present invention is a process for producing noodles, in particular, the fresh three-layered noodles comprising the steps of:

(1) preparing an outer-layer dough by adding starches, alkaline agents, salts or the like, and, if necessary, alginic acids and/or salts thereof, to flour(s) comprising, wheat flour, or wheat flour and grain flour(s) as major ingredient(s), and kneading them with water;

(2) preparing an inner-layer dough having pH of from neutral to weak alkaline by adding alginic acids and/or salts thereof, alkaline agents, and, if necessary, starches, salts, or the like, to flour(s) comprising, wheat flour, or wheat flour and grain flour(s), as major ingredient(s), and kneading them with water;

(3) preparing dough sheets from said inner-layer dough and outer-layer dough through conventional techniques such as rolling, then further rolling the dough sheets obtained to make a dough sheet having an outer-layer/inner-layer/outer-layer structure, making noodle strands by conventional techniques, and subjecting the noodle strands to gelatinization;

(4) treating the gelatinized noodle strands with acid(s) solution to acidify the strands; and (5) steps of packing hermetically said pH-adjusted strands, and sterilizing the noodles by heating, and, as a second embodiment of the present invention, a process for producing fresh three-layered noodles comprising a step, within a set of foregoing steps, of gelatinizing and acidifying the noodles simultaneously in the acid solution.

Although the inner layer and/or the outer layer dough or the dough sheets of the present invention can be prepared at atmospheric pressure, more desirable fresh three-layered noodles can be prepared if these are prepared under reduced pressure.

As flour(s) for doughs in the present invention, wheat flour, starches, grain flour(s) or the like, each of which has been used commonly in producing the noodles, can be employed. Applicable starches comprise wheat starch, rice starch, tapioca starch, potato starch, corn starch (including waxy species) or the like, and starches prepared by processing or chemically modifying the foregoing starches. Applicable grain flours comprise rice flour, sweet corn flour, buckwheat flour, barley flour, soybean flour or the like. Further, flour(s) to be employed in the present invention comprises, in addition to the ingredients listed above, proteins, polysaccharides, oil and fat, emulsifiers or the like used commonly in the production of noodles.

Alkaline agents referred to in the present invention are known alkaline agents generally applicable to food, for example, a mixture containing one or more of sodium carbonate, potassium carbonate, sodium bi-carbonate, ammonium carbonate sodium phosphate potassium phosphate, polyphosphates or condensed phosphates or the like can be employed. However, alkaline agents containing calcium salts are not preferable in the present invention. This is because the calcium reacts with alginic acids and gelates, and it becomes difficult to get enough kneading. Accordingly, calcium salts not causing such reactions or calcium salts to be used under conditions of not causing such reactions may be used.

Although the amount of alkaline agents added will vary according to kinds of the alkaline agents, said amount in the present invention is set so that the dough pH becomes from neutral to alkaline, preferably from about 6.5 to 9.0 to impart "stiffness" and "elasticity" to the noodles.

That is to say, if pH is less than about 6.5, "stiffness" and "elasticity" can not be imparted to noodles, and if pH exceeds 9.0, acidification of the noodles may become insufficient on the acid-treatment at the following step(s), thereby, a longer shelflife will not be expected and obtaining the desirable noodles will also be difficult.

Alginic acid salts employed in the present invention are alkali metal salts of alginic acids (e.g. sodium alginates, potassium alginates), magnesium salts and ammonium salts, and these alginic acid salts and alginic acids are available from the commercialized products. The addition may be done in the form of powder or a solution.

Though the amount of alginic acids and/or alginic acid salts added will be determined in consideration of the other ingredients, for example, the amount of alkaline agents added and pH of the dough based on said amount, degree of the acid-solution treatment, and properties of noodles (e.g. degree of stiffness), about 0.5 g (about 0.05%) or more per 1 kg flour(s) is usually preferred, but if the alginic acids component is less than about 0.05%, the effect of preventing the product from losing "stiffness" is reduced, and if an excessive amount is added thereto, the stiffness of the noodles becomes too strong, and the texture of the noodles is spoiled.

The preparation of the outer layer dough and the inner layer dough is carried out, respectively, at atmospheric pressure or under reduced pressure, with conventional apparatus, and in case of the latter, for example, vacuum mixers can be used.

Further, dough sheets of the outer layer and the inner layer are prepared respectively by rolling or the like with the conventional techniques, or can be prepared by making dough sheet extruded by an extruder or the like under reduced pressure, and for example, known apparatus for producing dough sheets (Japanese Patent Application No. 59-254855) may be used.

If the dough and/or the dough sheets are produced under reduced pressure, the deaeration is accelerated, then dense dough or dough sheets can be obtained, and as a result, better results in terms of smoothness, transparency and easiness to looseness can be obtained. Layering of the dough sheets of the outer layers and of the inner layer, and rolling and cutting into the noodle strands can be carried out according to conventional techniques.

The gelatinization of the noodle strands in the present invention may be conducted with conventional methods and apparatus, such as steam-heating, steaming, boiling or the like, and an acid-solution treatment of the noodle may be conducted along with either a method to treat noodle strands in an acid solution wherein pH is adjusted after said gelatinization (first method of the present invention), or a method wherein said gelatinization is conducted together with said acid solution treatment (second method of the present invention). In the former method, an acid solution treatment may be conducted by dipping the noodle strands into an acid solution, applying or spraying acid solution to the noodle strands, and in the latter method, said treatment may be conducted by heating the noodle strands with acid solution prepared by adding acid to water, or scattering or spraying the acid solution to the noodle strands in a steaming process.

Acids to be used in the acid solution treatment comprises the acids, which can be applied to foods, such as acetic acid, lactic acid, citric acid, malic acid and vinegar(s). Conditions for the acid solution treatment may be appropriately set in consideration of a kind of acids to be used, pH of the noodle strands, alkaline degree of the noodle strands, shelflife to be imparted, and properties of the noodles, However, it is necessary to acidify the acid-solution treated noodles, preferably pH 6 or less.

In the present invention, it is presumed that alginic acids and/or alginic acid salts become an insoluble alginic acids and make a three-dimensional-network-structure in noodle strands by said acid-solution treatment, and as a result, "stiffness" and "elasticity" can be imparted to the noodle strands. And, at the same time, since the noodle strands are acidified, a longer shelflife at room temperature can be obtained by hermetically packing the noodle strands and sterilizing the noodles by heating.

Accordingly, the acid solution treatment in the present invention can realize an impartment of "stiffness" and "elasticity" to noodles together with a longer shelflife at room temperature.

Incidentally, adequate "smoothness" and "stickiness" together with "stiffness" and "elasticity" can be imparted simultaneously by not adding alginic acids or adding a small amount of them to the outer layer in comparison with that of the inner layer, thereby, noodles having a desirable texture which is very close to that of fresh noodles can be obtained.

Further, when substantially the same amount of alginic acids are added to the inner layer and the outer layers of noodle strands, the desirable noodle can be prepared by adding larger amounts of starches to the outer layers.

The fixed weight of noodle strands, in which pH is adjusted through said steps, are packed hermetically by conventional methods, and sterilized by heating. Usually, although sterilizing conditions are dependant upon pH of the acid-treated noodles, heating of more than 30 minutes at 85° C., or for more than 20 minutes at 95° C., or for more than 10 minutes at 110° C. in a steam sterilizing chamber is required, and other necessary conditions can also be appropriately employed for the sterilization, in order to realize a longer shelflife at room temperature.

Fresh noodles produced by the present invention can be commercialized as fresh noodles packed in a conventional plastic bag, or in a cup-form vessel made of polystyrene or the like containing the noodles together with seasonings and/or condiments.

BEST MODE TO PRACTICE THE INVENTION

The present invention will be described along with the following examples. Incidentally, these examples disclose one aspect of the invention, therefore, the claimed scope should not be restricted by the disclosure thereof.

A: Application to thick-strand noodles

EXAMPLE 1

Noodles prepared at atmospheric pressure and treated with acid solution after gelatinization Three-layered noodles of the present invention were produced according to the following steps.

① 360 ml of kneading liquid was prepared by dissolving 30 g of salt in water, then, added to a flour-mixture made of 0.8 kg wheat flour (medium protein content flour) and 0.2 kg starch, and kneaded for 15 minutes with a mixer at atmospheric pressure to produce dough for the outer layer.

② 360 ml of kneading liquid was prepared by dissolving 2.5 g of sodium carbonate and 5.0 g of alginic acid in water, then, added to 1.0 kg wheat flour (medium protein content flour) and kneaded for 15 minutes with a mixer at atmospheric pressure to produce dough for the inner layer (dough pH 7.6).

③ Dough sheets made of the inner layer dough and the outer layer dough through rolls were further rolled through rolls to obtain a dough sheet of 2.6 mm thick having an outer-layer/inner-layer/outer-layer structure, and cut into noodle strands through a cutting roller of #10.

④ Said noodle strands were boiled for 12.5 minutes (in a boiling water wherein 0.05 g/l lactic acid was added), and cooled for 1 minute with tap water and for 1 minute with cold water of 10° C.

⑤ Noodle strands prepared in said step ④ were dipped for 1 minute into water of 17° C., wherein 11.5 g/l lactic acid was added, drained, and 15 g of edible oil was added to 1 kg of the noodle strands, then, ⑥ 220 g of the noodle strands prepared in said step ⑤ were put into a pouch and were hermetically packed.

⑦ Said packed noodles were sterilized in boiling water of 97° C. for 35 minutes, and were cooled in flowing water to obtain the three-layered noodles of the present invention (noodle strands pH 4.0).

EXAMPLE 2

Noodles (inner layer was prepared under reduced pressure)/treated with acid solution after gelatinization ① 360 ml of kneading liquid was prepared by dissolving 30 g of salt in water, then, added to a flour-mixture made of 0.8 kg wheat flour (medium protein content flour) and 0.2 kg starch, and kneaded for 15 minutes with a mixer at atmospheric pressure to produce dough for the outer layer.

② 370 ml of kneading liquid was prepared by dissolving 2.5 g of sodium carbonate and 5.0 g of alginic acid in water, then, added to 1.0 kg wheat flour (medium protein content flour) and mixed for 15 minutes with a mixer at atmospheric pressure and was extruded under the reduced pressure of vacuum degree of 740 mmHg (corresponding to the absolute pressure of 20 mmHg) to produce dough for the inner layer (dough pH 7.6).

③ Dough sheets made of the inner layer dough and the outer layer dough through rolls were further rolled through rolls to obtain a dough sheet of 2.6 mm thick having an outer-layer/inner-layer/outer-layer structure, then cut into noodle strands through a cutting roller of #10, and obtained fresh three-layered noodles of the present invention according to the corresponding procedure of Example 1 (noodle strands pH 4.1).

EXAMPLE 3

Noodles (outer and inner layers were prepared under reduced pressure)/treated with acid solution after gelatinization ① 360 ml of kneading liquid was prepared by dissolving 30 g of salt in water, then, added to a flour-mixture made of 0.8 kg wheat flour (medium protein content flour) and 0.2 kg starch and kneaded for 15 minutes with a mixer under reduced pressure (vacuum degree: 740 mmHg; corresponding to the absolute pressure of 760–740=20 mmHg, hereinafter meant the same pressure) to produce dough for the outer layer.

② 370 ml of kneading liquid was prepared by dissolving 2.5 g of sodium carbonate and 5.0 g of alginic acid in water, then, added to 1.0 kg wheat flour (medium protein content flour) and mixed for 15 minutes with a mixer at atmospheric pressure and extruded under the reduced pressure of vacuum degree of 740 mmHg to produce dough for the inner layer (dough pH 7.6).

③ Dough sheets made of the inner layer dough and the outer layer dough through rolls were further rolled through rolls to obtain a dough sheet of 2.6 mm thick having an outer-layer/inner-layer/outer-layer structure, then the dough sheet was cut into noodle strands through a cutting roller of #10, and obtained fresh three-layered noodles of the present invention according to the corresponding procedure of Example 1 (noodle strands pH 4.0).

EXAMPLE 4

Noodles (inner layer was prepared under reduced pressure)/acidified and gelatinized simultaneously ① 360 ml of kneading liquid was prepared by dissolving 30 g of salt in water, then, added to a flour mixture made of 0.8 kg wheat flour (medium protein content flour) and 0.2 kg starch and kneaded for 15 minutes with a mixer at atmospheric pressure to produce dough for the outer layer.

② 370 ml of kneading liquid was prepared by dissolving 2.5 g of sodium carbonate and 5.0 g of alginic acid in water, then, added to 1.0 kg wheat flour (medium protein content flour) and mixed for 15 minutes with a mixer at atmospheric pressure and extruded under the vacuum degree of 740 mmHg to produce dough for the inner layer (dough pH 7.6), ③ Dough sheets made of the inner layer dough and the outer layer dough through rolls were further rolled through rolls to obtain a dough sheet of 2.6 mm thick having an outer-layer/inner-layer/outer-layer structure, and the dough sheet was cut into noodle strands through a cutting roller of #10.

④ Said noodle strands were boiled for 15 minutes (in the boiling water wherein 1 g/l lactic acid was added), and in accordance with the corresponding procedure of Example 1, the fresh three-layered noodles of the present invention were obtained by taking them out from the acid solution, adding edible oil to the noodle strands, putting them into a pouch, and sterilizing them (noodle strands pH 4.2).

EXAMPLE 5

Noodles (inner and outer layers were prepared under reduced pressure)/alginic acids were added to the inner and the outer layers, and gelatinized and acidified simultaneously ① 360 ml of kneading liquid was prepared by dissolving 1.9 g of sodium carbonate, 3.0 g of alginic acid, and 30 g of salt in water, then, added to a flour mixture made of 0.8 kg wheat flour (medium protein content flour) and 0.2 kg starch, and kneaded for 15 minutes with a mixer under reduced pressure (vaccuum degree of 740 mmHg) to produce the dough for the outer layer (doughpH 7.3).

② 370 ml of kneading liquid was prepared by dissolving 2.5 g of sodium carbonate and 5.0 g of alginic acid in water, then, added to 1.0 kg wheat flour (medium protein content flour) and mixed for 15 minutes with a mixer at atmospheric pressure and extruded under the vacuum degree of 740 mmHg to produce dough for the inner layer (dough pH 7.6).

③ Dough sheets made of the inner layer dough and the outer layer dough through rolls were further rolled through rolls to obtain a dough sheet of 2.6 mm thick having an outer-layer/inner-layer/outer-layer structure, and the dough sheet was cut into noodle strands through a cutting roller of #10.

④ Said noodle strands were boiled for 15 minutes (in the boiling water wherein 1 g/l lactic acid was added), then in accordance with the corresponding procedure of Example 1, fresh three-layered noodles of the present invention were obtained by taking them out from the acid solution, adding edible oil to the strands, putting them into a pouch, and sterilizing them (noodle strands pH 4.3).

Comparative Example 1

Single-layered noodles incorporated alginic acid according to the conventional method Single-layered noodles incorporated alginic acid were prepared according to the following steps:

① 360 ml of kneading liquid was prepared by dissolving 2.5 g of sodium carbonate and 5.0 g of alginic acid in water. Then, dough (dough pH7.6) was prepared by adding the liquid to 1.0 kg wheat flour (medium protein content flour) and kneading the mixture so made for 15 minutes with a mixer at atmospheric pressure.

② Said noodle dough was rolled through rolls to obtain a dough sheet of 2.6 mm thick, and cut into noodle strands through a cutting roller of #10, then single-layered noodles incorporated the alginic acid were obtained (noodle strands pH 4.2) in accordance with the corresponding procedure of Example 1.

Comparative Example 2

Three-layered noodles according to the conventional method (Starches were added to the outer layer)

Conventional three-layered noodles were prepared according to the following steps:

① 360 ml of kneading liquid was prepared by dissolving 30 g of salt in water, then, added to a flour-mixture made of 0.8 kg wheat flour (medium protein content flour) and 0.2 kg starch and kneaded for 15 minutes with a mixer at atmospheric-pressure to produce dough for the outer layer, ② 360 ml of kneading liquid was prepared by dissolving 30 g of salt in water, then, added to 1.0 kg wheat flour (medium protein content flour) and kneaded for 15 minutes with a mixer at atmospheric-pressure to produce dough for the inner layer.

③ Dough sheets made of tile inner layer dough and the outer layer dough through rolls were further rolled through rolls to obtain a dough sheet of 2.6 mm thick having an outer-layer/inner-layer/outer-layer structure, and cut into noodle strands through a cutting roller of #10, and three-layered noodles were obtained in accordance with the corresponding method of said Example 1 (noodle strands pH 4.2).

Comparative Example 3

Three-layered noodles according to the conventional method (Egg white powder was added to the inner layer)

Conventional three-layered noodles were prepared according to the following steps.

① 360 ml of kneading liquid was prepared by dissolving 30 g of salt in water, then, added to 1.0 kg wheat flour (medium protein content flour) and kneaded for 15 minutes with a mixer at atmospheric pressure to produce dough for the outer layer, ② 360 ml of kneading liquid was prepared by dissolving 30 g of salt in water, then, added to a flour mixture made of 1.0 kg wheat flour (medium protein content flour) and 0.06 kg egg white powder and kneaded for 15 minutes with a mixture at atmospheric pressure to produce dough for the inner layer, ③ Dough sheets made of the inner layer dough and the outer layer dough through rolls were further rolled through rolls to obtain a dough sheet of 2.6 mm thick having an outer-layer/inner-layer/outer-layer structure, and cut into noodle strands through a cutting roller of #10, and three-layered noodles were obtained in accordance with the corresponding method of said Example 1 (noodle strands pH 4.0).

Comparative Example 4

Three-layered noodles according to the conventional method (Starches were added to the outer layer and the inner layer was prepared under reduced pressure)

Conventional three-layered noodles were prepared according to the following steps.

① 360 ml of kneading liquid was prepared by dissolving 30 g of salt in water, then, added to a flour mixture made of 0.8 kg wheat flour (medium protein content flour) and 0.2 kg starch to produce the dough for the outer layer, kneaded for 15 minutes with a mixer at atmospheric pressure.

② 360 ml of kneading liquid was prepared by dissolving 30 g of salt in water, then, added to 1.0 kg wheat flour (medium protein content flour) was mixed for 15 minutes with a mixer at atmospheric pressure and extruded under the reduced pressure of 740 mmHg to produce dough for the inner layer, ③ Dough sheets made of the inner layer dough and the outer layer dough through rolls were further rolled through rolls to obtain a dough sheet of 2.6 mm thick having an outer-layer/inner-layer/outer-layer structure, then cut into noodle strandsthrough a cutting roller of #10, and three layered noodles were obtained in accordance with the corresponding method of said Example 1 (noodle strands pH 4.1).

Comparative Example 5

Three-layered noodles according to the conventional method [the inner layer was prepared under reduced pressure, and gelatinized and acidified simultaneously]

Conventional three-layered noodles were prepared according to the following steps.

① 360 ml of kneading liquid was prepared by dissolving 30 g of salt in water, then, added to a flour mixture made of 0.8 kg wheat flour (medium protein content flour) and 0.2 kg starch and kneaded for 15 minutes with a mixer at atmospheric pressure to produce dough for the outer layer.

② 360 ml of kneading liquid was prepared by dissolving 30 g of salt in water, then, added to 1.0 kg wheat flour (medium protein content flour), mixed for 15 minutes with a mixer at atmospheric pressure and extruded under the reduced pressure of 740 mmHg to produce dough for the inner layer.

③ Dough sheets made of the inner layer dough and the outer layer dough through rolls were further rolled through rolls to obtain a dough sheet of 2.6 mm thick having an outer-layer/inner-layer/outer-layer structure, then cut into noodle strands through a cutting roller of #10, and three-layered noodles were obtained in accordance with the corresponding method of said Example 4 (noodle strands pH 4.0).

The results of sensory tests between the fresh noodles prepared in examples above and those of prepared by the conventional methods disclosed in the comparative examples are shown in Table 1. The evaluation was conducted by taking out the noodles from the pouch, putting them into a vessel made from foamed polystyrene, adding 400 cc of boiling water thereto, putting a lid thereon, waiting for 2 minutes, and evaluating the cooked noodles in five phases.

TABLE 1

|  | Comparative Example | | | | |
|---|---|---|---|---|---|
|  | 1 | 2 | 3 | 4 | 5 |
| Smoothness | Poor | Good | Fair | Excel. | Excel. |
| Stiffness | Excel. | Fair | Good | Fair | Poor |
| Stickiness | Poor | Fair | Poor | Fair | Fair |
| Dullness | None | Little | Less | Less | Less |
| Looseness | Excel. | Fair | Good | Good | Poor |

|  | Example | | | | |
|---|---|---|---|---|---|
|  | 1 | 2 | 3 | 4 | 5 |
| Smoothness | Good | Good | Excel. | Excel. | Excel. |
| Stiffness | Good | Excel. | Excel. | Good | Excel. |
| Stickiness | Excel. | Good | Excel. | Excel. | Excel. |
| Dullness | Least | Least | Least | Least | Least |
| Looseness | Excel. | Excel. | Excel. | Fair | Good |

Grades for the tested items are as follows:

(1) Grades on smoothness, stiffness, stickiness and dullness.

Fully trained ten examiners have tasted the subject noodles and evaluated them with the five phases of 5 (Excellent/None)/4 (Good/Least)/ 3 (Fair/Less)/2 (Poor/Little)/1 (Very Poor), and judge the noodles by the calculated average points and applying them to the following criterion zone:

| Excellent/None | ... | 4.6–5.0 point |
| Good/Least | ... | 3.6–4.5 point |
| Fair/Less | ... | 2.6–3.5 point |
| Poor/Little | ... | 1.6–2.5 point |
| Very Poor | ... | 1.0–1.5 point |

(2) Grades on looseness of noodle strands.

"Looseness" directs to the state of the noodles upon cooking by adding hot water thereto, and the evaluation thereof are determined along with the following phases:

"Excellent" is directed to a state of the noodle strands which can be loosened enough when chopsticks are put thereinto once or twice.

"Good" is directed to a state of the noodle strands which can be loosened when chopsticks are put thereinto once or twice.

"Fair" is directed to a state of the noodle strands which can be loosened when chopsticks are put thereinto three times or more.

"Poor" is directed to a state of the noodle strands which can not be loosened enough when chopsticks are put thereinto three times or more.

"Very Poor" is directed to a state of the noodle strands which can not be loosened at all and is entangled when chopsticks are put thereinto three times or more.

According to the tests above, products of the present invention have superior quality in smoothness (said quality had not been found in the conventional single-layered noodles incorporated alginic acids), and qualities in stiffness, stickiness, dullness and looseness (said qualities had not been found in the conventional three-layered noodles treated with acid solution).

B: Application to thin-strand noodles

EXAMPLE 6

Noodles prepared at atmospheric pressure and treated with acid solution after gelatinization Three-layered noodles of the present invention were produced according to the following steps.

① 360 ml of kneading liquid was prepared by dissolving 2.5 g of sodium carbonate, 15 g of salt, and 4.5 g of safflower color in water, then, added to a flour mixture made of 0.7 kg wheat flour (medium protein content flour) and 0.3 kg starch, and kneaded for 15 minutes with a mixer at atmospheric pressure to produce dough for the outer layer.

② 340 ml of kneading liquid was prepared by dissolving 2.5 g of sodium carbonate, 15 g of salt, 5.0 g of alginic acid, and 4.5 g of safflower color in water, then, added to 1.0 kg wheat flour (slightly-high protein content flour), and kneaded for 15 minutes with a mixer at atmospheric pressure to produce dough for the inner layer (dough pH 7.6).

③ Dough sheets made of the inner layer dough and the outer layer dough through rolls were further rolled through rolls to obtain a dough sheet of 1.3 mm thick having an outer-layer/inner-layer/outer-layer structure, and cut into noodle strands through a cutting roller (square) of #20.

④ Said noodle strands were steamed for 2 minutes in the steamer (100° C.) and cut them into the fixed amount. Said noodle strands were boiled for 30 seconds in a boiling water wherein 0.05 g/l lactic acid was added, and the water was drained for 30 seconds.

⑤ Noodle strands prepared in said step ④ were dipped for 30 seconds into water of 80° C., wherein 6.5 g/l lactic acid was added, then the water was drained off, and edible oil of 20 g was added to 1 kg of the noodle strands, then, ⑥ 180 g strands prepared in said step ⑤ were put into a pouch and were hermetically packed.

⑦ Said packed noodles were sterilized in boiling water of 97° C. for 35 minutes and cooled in flowing water to obtain three-layered noodles of the present invention (noodle strands pH 4.3).

EXAMPLE 7

Noodles (inner layer was prepared under reduced pressure)/treated with acid solution after gelatinization ① 360 ml of kneading liquid was prepared by dissolving 2.5 g of sodium carbonate, 15 g of salt and 4.5 g of safflower color in water, then, added to a flour mixture made of 0.7 kg wheat flour (medium protein content flour) and 0.3 kg starch, and kneaded for 15 minutes with a mixer at atmospheric pressure to produce dough for the outer layer.

② 340 ml of kneading liquid was prepared by dissolving 2.5 g of sodium carbonate, 15 g of salt, 5.0 g of alginic acid, and 4.5 g of safflower color in water, then, added to 1.0 kg wheat flour (slightly-high protein content flour), mixed for 15 minutes with a mixer at atmospheric pressure, and extruded under the reduced pressure of vacuum degree of 740 mmHg to produce dough for the inner layer (dough pH 7.6).

③ Dough sheets made of the inner layer dough and the outer layer dough through rolls were further rolled through rolls to obtain a dough sheet of 1.3 mm thick having an outer-layer/inner-layer/outer-layer structure, then cut into noodle strands through a cutting roller (square) of #20, and obtained fresh three-layered noodles of the present invention according to the corresponding procedure of Example 1 (noodle strands pH 4.3).

EXAMPLE 8

Noodles (inner and outer layers were prepared under reduced pressure)/treated with acid solution after gelatinization ① 360 ml of kneading liquid was prepared by dissolving 2.5 g of sodium carbonate, 15 g of salt and 4.5 g of safflower color in water, then, added to a flour mixture made of 0.7 kg wheat flour (medium protein content flour) and 0.3 kg starch, and kneaded for 15 minutes with a mixer under the reduced pressure (vacuum degree: 740 mmHg) to produce dough for the outer layer.

② 340 ml of kneading liquid was prepared by dissolving 2.5 g of sodium carbonate, 15 g of salt, 5.0 g of alginic acid, and 4.5 g of safflower color in water, then, added to 1.0 kg wheat flour (slightly-high protein content flour), and mixed for 15 minutes with a mixer at atmospheric pressure, and extruded under the reduced pressure of vacuum degree of 740 mmHg to produce dough for the inner layer (dough pH 7.6).

③ Dough sheets made of the inner layer dough and the outer layer dough through rolls were further rolled through rolls to obtain a noodle sheet of 1.3 mm thick having an outer-layer/inner-layer/outer-layer structure, then cut into noodle strands through a cutting roller (square) of #20, and fresh three-layered noodles of the present invention was obtained according to the corresponding procedure of Example 1 (noodle strands pH 4.3).

Comparative Example 6

Single-layered noodles incorporated alginic acid according to the conventional method Single-layered noodles incorporated alginic acid were prepared according to the following steps:

① 350 ml of kneading liquid was prepared by dissolving 2.5 g of sodium carbonate, 15 g of salt, 5.0 g of alginic acid, and 4.5 g of safflower color in water. And, dough (dough pH 7.6) was prepared by adding 1.0 kg wheat flour (slightly-high protein content flour) to the water and kneaded for 15 minutes with a mixer at atmospheric pressure.

② Said dough was rolled through a rolling to obtain a noodle sheet of 1.3 mm thick, and cut into noodle strands through a cutting roller (square) of #20, then, the single-layered noodles incorporated alginic acid were obtained in accordance with the corresponding procedure of Example 1.

Comparative Example 7

Three-layered noodles (1) according to the conventional method (Starches were added to the outer layer)

Conventional three-layered noodles (1) were prepared according to the following steps:

① 360 ml of kneading liquid was prepared by dissolving 2.5 g of sodium carbonate, 15 g of salt and 4.5 g of safflower color in water, then, added to a flour mixture made of 0.70 kg wheat flour (medium protein content flour) and 0.30 kg starch, and kneaded for 15 minutes with a mixer at atmospheric pressure to produce dough for the outer layer.

② 340 ml of kneading liquid was prepared by dissolving 2.5 g of sodium carbonate, 15 g of salt and 4.5 g of safflower color in water, then, added to 1.0 kg wheat flour (slightly-high protein content flour), and kneaded for 15 minute swith a mixer at atmospheric pressure to produce dough for the inner layer.

③ Dough sheets made of the inner layer dough and the outer layer dough through rolls were further rolled through rolls to obtain dough sheet of 1.3 mm thick having an outer-layer/inner-layer/outer-layer structure, then cut into noodle strands through a cutting roller (square) of #20, and three-layered noodles (1) were obtained in accordance with the corresponding method of said Example 1.

Comparative Example 8

Three-layerednoodles (2) according to the conventional method (Egg white powder was added to the inner layer)

Conventional three-layered noodles (2) were prepared according to the following steps:

① 340 ml of kneading liquid was prepared by dissolving 2.5 g of sodium carbonate, 15 g of salt and 4.5 g of safflower color in water, then, added to 1.0 kg wheat flour (medium protein content flour), and kneaded for 15 minutes with a mixer at atmospheric pressure to produce dough for the outer layer.

② 340 ml of kneading liquid was prepared by dissolving 2.5 g of sodium carbonate, 15 g of salt and 4.5 g of safflower color in water, then, added to flour mixture made of 1.0 kg wheat flour (slightly-high protein content flour) and 0.06 kg egg white powder, and kneaded for 15 minutes with a mixer at atmospheric pressure to produce dough for the inner layer.

③ Dough sheets made of the inner layer dough and the outer layer dough through rolls were further rolled through rolls to obtain a dough sheet of 1.3 mm thick having all outer-layer/inner-layer/outer-layer structure, then cut into noodle strands through a cutting roller (square) of #20, and three-layered noodles (2) are obtained in accordance with the corresponding method of said Example 1.

Comparative Example 9

Three-layered noodles (3) according to the conventional method (Starches were added to the outer layer and the inner layer was prepared under reduced pressure)

Conventional three-layered noodles (3) were prepared according to the following steps.

① 360 ml of kneading liquid was prepared by dissolving 2.5 g of sodium carbonate, 15 g of salt and 4.5 g of safflower color in water, then, added to flour mixture made of 0.7 kg wheat flour (medium protein content flour) and 0.3 kg starch to produce dough for the outer layer, and kneaded for 15 minutes with a mixer at atmospheric pressure.

② 340 ml of kneading liquid was prepared by dissolving 2.5 g of sodium carbonate, 15 g of salt and 4.5 g of safflower color in water, then, added to a flour mixture made of 1.0 kg wheat flour (slightly-high protein content flour), mixed for 15 minutes with a mixer at atmospheric pressure, and extruded under the reduced pressure of vacuum degree of 740 mmHg to produce dough for the inner layer.

③ Dough sheets made of the inner layer dough and the outer layer dough through rolls were further rolled through rolls to obtain a dough sheet of 1.3 mm thick having an outer-layer/inner-layer/outer-layer structure, then cut into noodle strands through a cutting roller (square) of #20, and the three-layered noodles (3) are obtained in accordance with the corresponding method of said example 1.

The results of sensory tests between the fresh noodles prepared in examples above and those of prepared by the conventional methods disclosed in the comparative examples are shown in Table 2. The evaluation was conducted by taking out the noodles from the pouch, putting them into a vessel made from foamed polystyrene, adding 400 cc of boiling water thereto, putting a lid thereon, waiting for 2 minutes, and evaluating the cooked noodles in five phases.

TABLE 2

|  | Comparative Example | | | | Example | | |
| --- | --- | --- | --- | --- | --- | --- | --- |
|  | 6 | 7 | 8 | 9 | 6 | 7 | 8 |
| Smoothness | Poor | Excel. | Fail | Excel. | Excel. | Excel. | Fair |
| Stiffness | Excel. | Poor | Fair | Fair | Good | Excel. | Excel. |
| Stickiness | Poor | Fair | Poor | Fair | Good | Good | Excel. |
| Dullness | None | Little | Less | Less | Least | Least | Least |
| Transparency | Poor | Good | Poor | Good | Good | Excel. | Excel. |
| Looseness | Excel. | Fair | Fair | Fair | Good | Good | Excel. |

Grades for the tested items are substantially the same as those for the thick strand noodles (A) aforementioned.

According to the comparison tests above, products of the present invention have superior quality in smoothness and transparency (said qualities had not been found in the conventional single-layered noodles incorporated alginic acids), and qualities in stiffness, stickiness, dullness and looseness (said qualities had not been found in the conventional three-layered noodles treated with acid solution).

C: Application to spaghetti type noodles

EXAMPLE 9

Noodles (inner and outer layers were prepared under reduced pressure)/treated with acid solution after gelatinization Fresh spaghetti type noodles of the three-layered noodles of the present invention were produced according to the following steps.

① In order to produce dough for the outer layer, 1700 ml of kneading liquid was added to a flour mixture made of 4.0 kg durum semorina and 1.0 kg starch, mixed for 5 minutes with a mixer at atmospheric pressure, and extruded under the reduced pressure of vacuum degree of 740 mmHg.

② 1500 ml of kneading liquid was prepared by dissolving 12.5 g of sodium carbonate, 25 g of alginic acid in water, then, added to 5.0 kg of durum semorina, and mixed for 1 minute with a mixer at atmospheric pressure, and extruded under the reduced pressure of vacuum degree of 740 mmHg to produce dough for the inner layer (dough pH 7.4).

③ Dough sheets made of the inner layer dough sheet and the outer layer dough sheet through rolls were further rolled through rolls to obtain a dough sheet of 1.4 mm thick having an outer-layer/inner-layer/outer-layer structure, then cut into noodle strands through a cutting roller (round) of #18.

④ Said noodle strands were steamed for 90 seconds in the steamer, cooled with air, cut, cooled with water, boiled for 80 seconds (in a boiling solution: pH 5~5.5), cooled, at 15° C. for 30 seconds with water, and drained the water.

⑤ Noodle strands prepared in said step ④ were dipped for 30 seconds into acid solution of 15° C. (450 g lactic acid and 300 g salt per 30 l), then the solution were drained, and 2.5 g of edible oil was added to the noodle strands, then, ⑥ 180 g of noodle strands prepared in said step ⑤ were put into a pouch and were hermetically packed.

⑦ Said packed noodles were sterilized in boiling water of 97° C. for 35 minutes and were cooled in flowing water to obtain fresh spaghetti type noodles of the three-layered noodles of the present invention.

Comparative Example 10

Single-layered noodles incorporated alginic acids according to the conventional method Single-layered noodles (spaghetti) incorporated alginic acids were prepared according to the following steps:

① In order to produce dough for the inner layer (dough pH 7.4), 1500 ml of kneading liquid was prepared by dissolving 12.5 g of sodium carbonate, 25 g of alginic acid in water, then added to 5.0 kg of durum semorina, and mixed for 1 minute with a mixer at atmospheric pressure, and extruded under the reduced pressure of vacuum degree of 740 mmHg.

② Said dough was rolled through rolls to obtain a dough sheet of 1.4 mm thick, and cut into noodle strands through a cutting roller (round) of #18, then, single-layered noodles (spaghetti) incorporated alginic acids are obtained (noodle strand pH 4.0) in accordance with the corresponding procedure of Example 7.

The results of sensory tests between the fresh noodles prepared in the example above and that of prepared by the conventional methods disclosed in the comparative example are shown in Table 3. The evaluation, substantially the same as that of the thick noodle strands (A), was conducted by taking out the noodles from the pouch, putting them into a vessel made from foamed polystyrene, adding 400 cc of boiling water thereto, putting a lid thereon, waiting for 2 minutes, draining the water, and evaluating the cooked noodles in five phases.

TABLE 3

|  | Comparative Example 10 | Example 9 |
| --- | --- | --- |
| Smoothness | Fair | Excellent |
| Stiffness | Excellent | Excellent |
| Stickiness | Fair | Excellent |
| Transparency | Fair | Good |
| Looseness | Excellent | Excellent |

Grades for the tested items are substantially the same as those for the thick-strand noodles (A) aforementioned.

According to the comparison results above, products of the present invention have superior quality in "smoothness" (said quality had not been found in the conventional single-layered noodles incorporated alginic acids), and qualities in stiffness, stickiness, dullness and looseness were obtained.

D: Application to noodles incorporated buckwheat flour

EXAMPLE 10

Noodles (inner and outer layers were prepared under reduced pressure)/treated with acid solution after gelatinization Three-layered noodles of the present invention were produced according to the following steps.

① In order to produce dough for the outer layer, 300 ml of kneading liquid was added to a flour mixture made of 0.7 kg wheat flour (high protein content flour) and 0.3 kg buckwheat flour, and kneaded for 15 minutes under the reduced pressure of vacuum degree of 700 mmHg.

② 300 ml of kneading liquid was prepared by dissolving 2.5 g of sodium carbonate, 5.0 g of alginic acid in water, then, added to a flour mixture made of 0.7 kg wheat flour (high protein content flour) and 0.3 kg buckwheat flour, and mixed for 15 minutes with a mixer at atmospheric pressure, and extruded under the reduced pressure of vacuum degree of 740 mmHg to produce dough for the inner layer (dough pH 6.9).

③ Dough sheets made of the inner layer dough and the outer layer dough through rolls were further rolled through rolls to obtain a dough sheet of 1.2 mm thick having an outer-layer/inner-layer/outer-layer structure, and cut into noodle strands through a cutting roller (square) of #20.

④ Said noodle strands were steamed for 2 minutes in the steamer, boiled for 80 seconds (in the solution wherein 0.05 g/l lactic acid was added thereto), and cooled for 30 seconds with tap water.

⑤ Noodle strands prepared in said step ④ were dipped for 1 minute into solution of 17° C. wherein 17.5 g/l lactic acid was added, then the solution was drained, and 15 g of edible oil was added to 1 kg of the noodle strands, then, ⑥ 180 g of the noodle strands prepared in said step ⑤ were put into a pouch and were hermetically packed.

⑦ Said packed noodles were sterilized in boiling water of 97° C. for 35 minutes and were cooled in flowing water to obtain three-layered fresh buckwheat noodles of the present invention (noodle strands pH 4.1).

EXAMPLE 11

Noodles wherein starches were added to the outer layer

Fresh three-layered noodles of the present invention were prepared according to the following steps:

① In order to produce dough for the inner layer, 315 ml of kneading liquid was added to a flour mixture made of 0.7 kg wheat flour (high protein content flour), 0.2 kg buckwheat flour and 0.1 kg starch, and kneaded for 15 minutes under the reduced pressure of vacuume degree of 700 mmHg.

② 300 ml of kneading liquid was prepared by dissolving 2.5 g of sodium carbonate, 5.0 g of alginic acid in water, then, added to a flour mixture made of 0.6 kg wheat flour (high protein content flour) and 0.4 kg buckwheat flour, and kneaded for 15 minutes with a mixer at atmospheric pressure, and extruded under the reduced pressure of vacuum degree of 740 mmHg to produce dough for the inner layer (dough pH 6.7).

③ Dough sheets made of the inner layer dough and the outer layer dough through rolls were further rolled through rolls to obtain a dough sheet of 1.2 mm thick having an outer-layer/inner-layer/outer-layer structure, and cut into noodle strands through a cutting roller (square) of #20, then three-layered fresh buckwheat noodles of the present invention are obtained (noodle strands pH 4.1) in accordance with the corresponding procedure of Example 5.

Comparative Example 11

Single-layered noodles incorporated alginic acid according to the conventional method Single-layered noodles incorporated alginic acid were prepared according to the following steps:

① 300 ml of kneading liquid was prepared by dissolving 2.5 g of sodium carbonate and 5.0 g of alginic acid in water. Then, dough (dough pH 6.9) was prepared by adding a flour mixture made of 0.7 kg wheat flour (high protein content flour) and 0.3 kg buckwheat flour to water, and kneading them for 15 minutes with a mixer at atmospheric pressure.

② Said dough was rolled through rolls to obtain a dough sheet of 1.2 mm thick, and cut into noodle strands through a cutting roller (square) of #20, then, single-layered (buckwheat) noodles incorporated alginic acid were obtained (noodle strand pH 4.0) in accordance with the corresponding procedure of Example 5.

Comparative Example 12

Three-layered noodles according to the conventional method (Egg white powder was added to the inner layer)

Conventional three-layered noodles were prepared according to the following steps:

① In order to prepare dough for the outer layer, 300 ml of kneading liquid was added to a flour mixture made of 0.7 kg wheat flour (high protein content flour) and 0.3 kg buckwheat flour, and kneaded for 15 minutes with a mixer at atmospheric pressure.

② In order to produce dough for the inner layer, 300 ml of kneading liquid was added to a flour mixture made of 0.68 kg wheat flour (high protein content flour), 0.32 kg buckwheat flour and 0.06 kg egg white powder, and kneaded for 15 minutes with a mixer at atmospheric pressure.

③ Dough sheets made of the inner layer dough and the outer layer dough through rolls were further rolled through rolls to obtain a dough sheet of 1.2 mm thick having an outer-layer/inner-layer/outer-layer structure, cut into noodle strands through a cutting roller (square) of #20, and three-layered noodles (2) were obtained in accordance with the corresponding method of said Example 5 (noodle strand pH 4.0).

Comparative Example 13

Single-layered noodles not incorporated alginic acids according to the conventional method Single-layered noodles not incorporated alginic acids were prepared according to the following steps:

① 300 ml of kneading liquid was added to a flour mixture made of 0.7 kg wheat flour (high protein content flour) and 0.3 kg buckwheat flour, and kneaded for 15 minutes with a mixer at atmospheric pressure to produce dough (dough pH 6.9).

② Said dough was rolled through rolls to obtain a dough sheet of 1.2 mm thick, and cut into noodle strands through a cutting roller (square) of #20, and, single-layered (buckwheat) noodles not incorporated alginic acids were obtained (noodle strand pH 3.9) in accordance with the corresponding procedure of Example 5.

The results of sensory tests between the fresh noodles prepared in examples above and those of prepared by the conventional methods disclosed in the comparative examples are shown in Table 4. The evaluation, substantially the same as that of the thick strand noodles (A), was conducted by taking out the noodles from the pouch, putting them into a vessel made from foamed polystyrene, adding 400 cc of boiling water thereto, putting a lid thereon, waiting for 1 minute, and evaluating the cooked noodles in five phases.

TABLE 4

|  | Comparative Example | | | Example | |
| --- | --- | --- | --- | --- | --- |
|  | 11 | 12 | 13 | 10 | 11 |
| Smoothness | Fair | Fair | Good | Good | Excel. |
| Stiffness | Excel. | Good | Pool | Good | Good |
| Stickiness | Poor | Poor | Fair | Excel. | Excel. |
| Dullness | None | Least | Little | None | None |
| Looseness | Excel. | Excel. | Good | Excel. | Excel. |

Grades for the tested items are substantially the same as those for the thick strand noodles (A) aforementioned.

According to the comparison results above, products of the present invention have superior quality in smoothness (said quality had not been found in the conventional single-layered noodles incorporating alginic acid), and will also provide the three-layered noodles having superior qualities in stiffness, stickiness, dullness and looseness (said qualities had not been found in the conventional acid-treated three-layer noodles).

(Industrial Applicability)

According to the method of the present invention, wet and fresh noodles which can realize a longer shelflife and have a desirable texture of being very close to that of fresh noodles can be produced.

That is to say, if these dough sheets are rolled, cut into a noodle strand, gelatinized, and treated with acid solution, a formation of the net-work structure of insoluble alginic acids is produced in the inner layer of the noodles, thereby, "stiffness" and "elasticity" will be imparted to the noodles, because the inner layer of the three-layered noodles in the present invention is made of a dough sheet containing alginic acids and/or alginic acid salts. Further, "smoothness" and "stickiness" which are essential in the inner layer can be imparted to the noodle, by not adding alginic acids to the outer layer, or adding less amount of alginic acids and/or alginic acid salts to the outer layer, in comparison with the amount to be added to the inner layer, thereby, the noodles having a desirable texture of being very close to that of fresh noodles and having the adequate "stiffness", "elasticity", "smoothness" and "stickiness" can be obtained. Further, even after moisture gradient of the noodles between the outer layer and the core portion is eliminated, insoluble alginic acids in the core of this three-layers structure will prevent the noodles from weakening and becoming dull.

Further, in the present invention, since an acid-treatment step for imparting "stiffness" and "elasticity" to noodles is identical to the necessary step to give the noodles a longer shelflife at room temperature, the production process can be simplified.

Meanwhile, when the alginic acid was added to the inner layer only in the three-layered structure, a difference on the texture between the inner layer and the outer layer may become too large, thereby, undesirable texture may be generated. However, the undesirable texture may be eliminated, if the difference on the texture between the inner layer and the outer layer is reduced by further adding the alginic acid, in an amount to be added to the inner layer or less, to the outer layer. In addition, the present invention improve "looseness" of the noodles remarkably at the time of eating, in comparison with the conventional wet noodles which can be preserved at room temperature.

Further, if dough or dough sheets of the outer and/or the inner layer(s) is(are) prepared under reduced pressure, deaeration of the dough can be realized, thereby, the fresh noodles having superior qualities in "smoothness", "transparency", "looseness" or the like can be produced.

We claim:

1. A process for producing fresh three-layered noodles, comprising the steps of:

(1) preparing an outer-layer dough by kneading grain flour with water;

(2) preparing an inner layer dough having a pH of from neutral to alkaline by adding to grain flour (a) an alkaline agent and (b) an alginic acid compound selected from the group consisting of an alginic acid, an alginic acid salt, and mixtures thereof, and kneading said dough with water;

(3) preparing dough sheets from each of said inner-layer dough and said outer-layer dough through rolling of said inner-layer dough and said outer-layer dough, and rolling the dough sheets so obtained to make a layered dough sheet having an outer-layer/inner-layer/outer-layer structure;

(4) preparing noodle strands by cutting the layered dough sheet having the outer-layer/inner-layer/outer-layer structure, and subjecting the noodle strands to gelatinization; and (5) treating the gelatinized noodle strands with an acid solution to acidify the noodle strands.

2. A process for producing fresh three-layered noodles according to claim 1, wherein said grain flour in step (1) and/or step (2) is wheat flour.

3. A process for producing fresh three-layered noodles according to claim 1, wherein said step (1) of the process further comprises adding an additive selected from the group consisting of starches, alkaline agents, salts, and mixtures thereof.

4. A process for producing fresh three-layered noodles according to claim 1, wherein said step (2) of the process further comprises adding an additive selected from the group consisting of starches, salts, and mixtures thereof.

5. A process for producing fresh three-layered noodles according to claim 1, wherein said step (1) of the process further comprises adding an alginic acid compound selected from the group consisting of an alginic acid, an alginic acid salt, and mixtures thereof, and the amount of the alginic acid compound is less than that added to the inner-layer dough.

6. A process for producing fresh three-layered noodles according to claim 1, wherein the pH of the inner-layer dough treated with the alkaline agent in said step (2) is in the range of about 6.5 to 9.0.

7. A process for producing fresh three-layered noodles according to claim 1, wherein the pH of the noodle strands treated with the acid solution in said step (5) is less than about 6.

8. A process for producing fresh three-layered noodles according to claim 1, wherein said inner-layer dough is prepared at a pressure at or below atmospheric pressure.

9. A process for producing fresh three-layered noodles according to claim 1, wherein said outer-layer dough is prepared at a pressure at or below atmospheric pressure.

10. A process for producing fresh three-layered noodles according to claim 1, wherein each of said inner-layer dough and said outer-layer dough is prepared at a pressure at or below atmospheric pressure.

11. A process for producing fresh three-layered noodles according to claim 1, further comprising the step of:

(6) packing hermetically said pH-adjusted noodle strands, and heating said pH-adjusted noodle strands.

12. A process for producing fresh three-layered noodles, comprising the steps of:

(1) preparing an outer-layer dough by kneading grain flour with water;

(2) preparing an inner layer dough having a pH of from neutral to alkaline by adding to grain flour (a) an alkaline agent and (b) an alginic acid compound selected from the group consisting of an alginic acid, an alginic acid salt, and mixtures thereof, and kneading said dough with water;

(3) preparing dough sheets from each of said inner-layer dough and said outer-layer dough through rolling of said inner-layer dough and said outer-layer dough, and rolling the dough sheets so obtained to make a layered dough sheet having an outer-layer/inner-layer/outer-layer structure;

(4) preparing noodle strands by cutting the layered dough sheet having the outer-layer/inner-layer/outer-layer structure; and (5) gelatinizing and acidifying the noodle strands simultaneously by treating the noodle strands with an acid solution.

13. A process for producing fresh three-layered noodles according to claim 12, wherein said grain flour in step (1) and/or step (2) is wheat flour.

14. A process for producing fresh three-layered noodles according to claim 12, wherein said step (1) of the process further comprises adding an additive selected from the group consisting of starches, alkaline agents, salts, and mixtures thereof.

15. A process for producing fresh three-layered noodles according to claim 12, wherein said step (2) of the process further comprises adding an additive selected from the group consisting of starches, salts, and mixtures thereof.

16. A process for producing fresh three-layered noodles according to claim 12, wherein said step (1) of the process further comprises adding an alginic acid compound selected from the group consisting of an alginic acid, an alginic acid salt, and mixtures thereof, and the amount of the alginic acid compound is less than that added to the inner-layer dough.

17. A process for producing fresh three-layered noodles according to claim 12, wherein the pH of the inner-layer dough treated with the alkaline agent in said step (2) is in the range of about 6.5 to 9.0.

18. A process for producing fresh three-layered noodles according to claim 12, wherein the pH of the noodle strands treated with acid solution in said step (5) is less than about 6.

19. A process for producing fresh three-layered noodles according to claim 12, wherein said inner-layer dough is prepared at a pressure at or below atmospheric pressure.

20. A process for producing fresh three-layered noodles according to claim 12, wherein said outer-layer dough is prepared at a pressure at or below atmospheric pressure.

21. A process for producing fresh three-layered noodles according to claim 12, wherein each of said inner-layer dough and said outer-layer dough is prepared at a pressure at or below atmospheric pressure.

22. A process for producing fresh three-layered noodles according to claim 12, further comprising the step of:

(6) packing hermetically said pH-adjusted noodle strands, and heating said pH-adjusted noodle strands.

* * * * *

UNITED STATES PATENT AND TRADEMARK OFFICE
CERTIFICATE OF CORRECTION

PATENT NO. : 5,543,168

DATED : August 6, 1996

INVENTORS : Masahiro YAMASAKI ET AL.

It is certified that error appears in the above-identified patent and that said Letters Patent is hereby corrected as shown below:

Column 2, line 16, "defects insufficient" should be --defects of insufficient--.

Column 3, line 9, "comprises" should be --comprise,--.

Column 3, line 16, "phosphate potassium" should be --phosphate, potassium--.

Column 4, line 59, "dependant" should be --dependent--.

Column 8, line 11, "of tile" should be --of the--.

Column 12, line 59, "Three-layerednoodles" should be --Three-layered noodles--.

Column 13, line 25, "having all" should be --having an--.

Column 13, line 60, "example 1." should be --Example 1.--.

Column 14, line 10, Table 2, 4th column, "Fail" should be --Fair--.

Column 18, line 7, Table 4, 4th column, "Pool" should be --Poor--.

Column 18, line 36, "are essential" should be --are not essential--.

UNITED STATES PATENT AND TRADEMARK OFFICE
CERTIFICATE OF CORRECTION

PATENT NO. : 5,543,168
DATED : August 6, 1996
INVENTOR(S) : Masahiro Yamaskaki, et al It is certified that error appears in the above-indentified patent and that said Letters Patent is hereby corrected as shown below:

Column 18, line 47, "three-layers" should be -- three-layer --.

Signed and Sealed this

Twenty-ninth Day of April, 1997

BRUCE LEHMAN

*Attest:*

*Attesting Officer*  Commissioner of Patents and Trademarks